United States Patent
Li (10) Patent No.: US 10,687,066 B2
(45) Date of Patent: Jun. 16, 2020

(54) LOW POWER-CONSUMING ENCODING METHOD, AND APPARATUS

(71) Applicant: HUAWEI TECHNOLOGIES CO., LTD., Shenzhen, Guangdong (CN)

(72) Inventor: Ming Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 15/471,419

(22) Filed: Mar. 28, 2017

(65) Prior Publication Data

US 2017/0201754 A1  Jul. 13, 2017

Related U.S. Application Data (63) Continuation of application No. PCT/CN2015/089447, filed on Sep. 11, 2015.

(30) Foreign Application Priority Data

Sep. 30, 2014 (CN) .......................... 2014 1 0526071

(51) Int. Cl.
*H04N 19/156* (2014.01)
*H04N 19/139* (2014.01)
(Continued)

(52) U.S. Cl.
CPC ......... *H04N 19/156* (2014.11); *H04N 19/105* (2014.11); *H04N 19/132* (2014.11);
(Continued)

(58) Field of Classification Search
CPC .. H04N 19/513; H04N 19/105; H04N 19/139; H04N 19/14; H04N 19/132;
(Continued)

(56) References Cited

U.S. PATENT DOCUMENTS 5,946,043 A * 8/1999 Lee ...................... H04N 19/503
375/240.24
8,265,165 B2 * 9/2012 Park ...................... H04N 19/172
375/240.24

(Continued)

FOREIGN PATENT DOCUMENTS

| CN | 101094411 A | 12/2007 |
| CN | 101390389 A | 3/2009 |

(Continued)

OTHER PUBLICATIONS

International Search Report, dated Dec. 15, 2015, in International Application No. PCT/CN2015/089447 (4 pp.).

(Continued)

*Primary Examiner* — Zaihan Jiang
(74) *Attorney, Agent, or Firm* — Fish & Richardson P.C.

(57) ABSTRACT

A low power-consuming encoding method and an apparatus are provided. The method includes: receiving a quantity of skip macroblocks and a quantity of macroblocks whose motion vectors (MVs) are a preset value, where the quantity of skip macroblocks and the quantity of macroblocks whose MVs are the preset value are corresponding to a target frame and are sent by a target encoder; obtaining an encoding complexity index according to the quantity of skip macroblocks and the quantity of macroblocks whose MVs are the preset value, and determining a scenario type corresponding to the target frame; and using a secondary encoder as the target encoder if a quantity of first pre-determined scenarios in scenario types separately corresponding to multiple consecutive target frames is greater than a threshold. Power consumed by the secondary encoder is less than power consumed by a primary encoder, which effectively reduces power consumption of encoding.

20 Claims, 4 Drawing Sheets

(51) Int. Cl.
*H04N 19/14* (2014.01)
*H04N 19/52* (2014.01)
*H04N 19/176* (2014.01)
*H04N 19/105* (2014.01)
*H04N 19/172* (2014.01)
*H04N 19/513* (2014.01)
*H04N 19/132* (2014.01)

(52) U.S. Cl.
CPC ........... *H04N 19/139* (2014.11); *H04N 19/14* (2014.11); *H04N 19/172* (2014.11); *H04N 19/176* (2014.11); *H04N 19/513* (2014.11); *H04N 19/52* (2014.11)

(58) Field of Classification Search
CPC .... H04N 19/172; H04N 19/176; H04N 19/52; H04N 19/156
USPC .................................................. 375/240.02
See application file for complete search history.

(56) References Cited

U.S. PATENT DOCUMENTS

| | | | |
|---|---|---|---|
| 8,326,608 B2 | 12/2012 | Hu et al. | |
| 8,897,370 B1* | 11/2014 | Wang | H04N 19/139 375/240.2 |
| 9,615,098 B1* | 4/2017 | Yi | H04N 19/132 |
| 2005/0018772 A1* | 1/2005 | Sung | H04N 19/56 375/240.16 |
| 2005/0036548 A1 | 2/2005 | He et al. | |
| 2005/0047504 A1* | 3/2005 | Sung | H04N 19/105 375/240.2 |
| 2007/0274385 A1 | 11/2007 | He | |
| 2008/0054158 A1* | 3/2008 | Ariyur | G01S 3/7864 250/203.1 |
| 2009/0097546 A1 | 4/2009 | Lee et al. | |
| 2010/0027622 A1 | 2/2010 | Dane et al. | |
| 2010/0195733 A1* | 8/2010 | Yan | H04N 19/139 375/240.16 |
| 2011/0002381 A1* | 1/2011 | Yang | H04N 19/172 375/240.03 |
| 2011/0164677 A1* | 7/2011 | Lu | H04N 19/176 375/240.02 |
| 2011/0182354 A1* | 7/2011 | Jang | H04N 19/132 375/240.02 |
| 2012/0307904 A1* | 12/2012 | Yi | H04N 19/176 375/240.16 |
| 2013/0322539 A1 | 12/2013 | Li | |
| 2014/0153644 A1* | 6/2014 | Dzik | H04N 19/119 375/240.12 |
| 2014/0198851 A1* | 7/2014 | Zhao | H04N 19/142 375/240.16 |

FOREIGN PATENT DOCUMENTS

| | | |
|---|---|---|
| CN | 101511014 A | 8/2009 |
| CN | 101529912 A | 9/2009 |
| CN | 101989429 A | 3/2011 |
| CN | 102724504 A | 10/2012 |
| CN | 102740073 A | 10/2012 |
| CN | 104244004 A | 12/2014 |

OTHER PUBLICATIONS

International Search Report dated Dec. 15, 2015 in corresponding International Application No. PCT/CN2015/089447.
Chinese Office Action dated Jan. 4, 2017 in corresponding Chinese Patent Application No. 201410526071.5.
International Telecommunication Union Telecommunication Standardization Sector, H.264, *Series H: Audiovisual and Multimedia Systems Infrastructure of audiovisual services—Coding of moving video* "Advanced video coding for generic audiovisual services." Feb. 2014; pp. 790.
International Telecommunication Union Telecommunication Standardization Sector, H.265, *Series H: Audiovisual and Multimedia Systems Infrastructure of audiovisual services—Coding of moving video* "High efficiency video coding." Apr. 2013; pp. 317.

\* cited by examiner

LOW POWER-CONSUMING ENCODING METHOD, AND APPARATUS

CROSS-REFERENCE TO RELATED APPLICATIONS

This application is a continuation of International Application No. PCT/CN2015/089447, filed on Sep. 11, 2015, which claims priority to Chinese Patent Application No. 201410526071.5, filed on Sep. 30, 2014. The disclosures of the aforementioned applications are hereby incorporated by reference in their entireties.

TECHNICAL FIELD

Embodiments of the present invention relate to the communications technologies, and in particular, to a low power-consuming encoding method and an apparatus.

BACKGROUND

Compared with the H.264 video protocol, encoding complexity according to the latest H.265 video protocol is increased by 8 to 10 times, which causes a linear increase of power consumption of an H.265 encoder.

In the prior art, clock gating is used to resolve a problem that the H.265 encoder has relatively high power consumption. The clock gating specifically falls into two types: frame-level clock gating and module-level clock gating. The frame-level clock gating means that in an encoding process of an encoder, all internal clocks inside the encoder are enabled, all the clocks include a register configuration clock, and other clocks except the register configuration clock in all the clocks are disabled after encoding ends, so as to reduce power consumption. The module-level clock gating means that when a submodule inside an encoder encodes a macroblock in a frame of picture, an internal clock is enabled; when the submodule completes encoding the macroblock, the internal clock is disabled; and the internal clock is not enabled again until the submodule starts to encode a next macroblock.

The clock gating can reduce power consumption only at an encoding interval of the encoder, and if the encoder performs encoding in a full-speed operating mode, the encoding interval of the encoder is relatively small. Therefore, limited power consumption is reduced by using the clock gating.

SUMMARY

Embodiments of the present invention provide a low power-consuming encoding method and an apparatus, thereby providing a method for effectively reducing power consumption of an encoder.

According to a first aspect, the present invention provides a low power-consuming encoding method, and the method includes:

receiving a quantity of skip macroblocks and a quantity of macroblocks whose motion vectors MVs are a preset value, where the quantity of skip macroblocks and the quantity of macroblocks whose motion vectors MVs are the preset value are corresponding to a target frame and are sent by a target encoder, the target frame is a data frame currently encoded by the target encoder, and the target encoder is a primary encoder;

obtaining an encoding complexity index according to the quantity of skip macroblocks and the quantity of macroblocks whose motion vectors MVs are the preset value, and determining, according to the encoding complexity index, a scenario type corresponding to the target frame; and using a secondary encoder as the target encoder if a quantity of first pre-determined scenarios in scenario types separately corresponding to the multiple consecutive target frames is greater than a first switching threshold, so that the secondary encoder encodes a subsequent target frame.

According to the foregoing low power-consuming encoding method, after the using a secondary encoder as the target encoder, so that the secondary encoder encodes a subsequent target frame, the method further includes:

using the primary encoder as the target encoder if a quantity of second pre-determined scenarios in scenario types separately corresponding to the multiple subsequent consecutive target frames is greater than a second switching threshold.

With reference to the first aspect, in a first possible implementation manner, the obtaining an encoding complexity index according to the quantity of skip macroblocks and the quantity of macroblocks whose motion vectors MVs are the preset value includes:

calculating the encoding complexity index Q according to a formula $Q=(M0+M1)/N$, where M0 represents the quantity of skip macroblocks, M1 represents the quantity of macroblocks whose motion vectors MVs are the preset value, and N represents a total quantity of macroblocks that is corresponding to the target frame, where the preset value is 0 or the preset value is less than $\pm 1$.

With reference to the first possible implementation manner of the first aspect, in a second possible implementation manner, the determining, according to the encoding complexity index, a scenario type corresponding to the target frame includes:

if the encoding complexity index is greater than a first complexity threshold, determining that the scenario type corresponding to the target frame is the second pre-determined scenario: or if the encoding complexity index is less than a second complexity threshold, determining that the scenario type corresponding to the target frame is the first pre-determined scenario, where the first complexity threshold is greater than the second complexity threshold.

With reference to the first aspect, in a third possible implementation manner, the low power-consuming encoding method further includes:

receiving a quantity i of motion targets in the target frame, a size $S_i$ of each motion target, a motion range $W_i$ of each motion target, and a picture size S of the target frame, and calculating a picture scenario motion ratio P according to $P=\Sigma(S_i/S)*|W_i|$, where the quantity i of motion targets in the target frame, the size $S_i$ of each motion target, and motion range $W_i$ of each motion target, and the picture size S of the target frame are sent by a motion target detection apparatus; and the determining, according to the encoding complexity index, a scenario type corresponding to the target frame includes:

determining, according to the encoding complexity index and the picture scenario motion ratio, the scenario type corresponding to the target frame.

With reference to the third possible implementation manner of the first aspect, in a fourth possible implementation manner, the determining, according to the encoding complexity index and the picture scenario motion ratio, the scenario type corresponding to the target frame includes:

if the encoding complexity index is greater than a first complexity threshold and the picture scenario motion ratio is greater than a first motion intensity threshold, determining that the scenario type corresponding to the target frame is a second pre-determined scenario; or if the encoding complexity index is less than a second complexity threshold and the picture scenario motion ratio is less than a second motion intensity threshold, determining that the scenario type corresponding to the target frame is the first pre-determined scenario, where the first complexity threshold is greater than the second complexity threshold, and the first motion intensity threshold is greater than the second motion intensity threshold.

According to a second aspect, the present invention provides an encoding pre-analysis apparatus, and the encoding pre-analysis apparatus includes:

a receiving module, configured to receive a quantity of skip macroblocks and a quantity of macroblocks whose motion vectors MVs are a preset value, where the quantity of skip macroblocks and the quantity of macroblocks whose motion vectors MVs are the preset value are corresponding to a target frame and are sent by a target encoder, the target frame is a data frame currently encoded by the target encoder, and the target encoder is a primary encoder;

a calculation module, configured to obtain an encoding complexity index according to the quantity of skip macroblocks and the quantity of macroblocks whose motion vectors MVs are the preset value;

a determining module, configured to determine, according to the encoding complexity index, a scenario type corresponding to the target frame; and a switching module, configured to use a secondary encoder as the target encoder if a quantity of first pre-determined scenarios in scenario types separately corresponding to the multiple consecutive target frames is greater than a first switching threshold, so that the secondary encoder encodes a subsequent target frame.

With reference to the second aspect, in a first possible implementation manner, the switching module is further configured to use the primary encoder as the target encoder if a quantity of second pre-determined scenarios in scenario types separately corresponding to the multiple subsequent consecutive target frames is greater than a second switching threshold.

With reference to the first possible implementation manner of the second aspect, in a second possible implementation manner, the calculation module is specifically configured to calculate the encoding complexity index Q according to a formula $Q=(M0+M1)/N$, where M0 represents the quantity of skip macroblocks, M1 represents the quantity of macroblocks whose motion vectors MVs are the preset value, and N represents a total quantity of macroblocks that is corresponding to the target frame, where the preset value is 0 or the preset value is less than ±1.

With reference to the second possible implementation manner of the second aspect, in a third possible implementation manner, the determining module is specifically configured to: if the encoding complexity index is greater than a first complexity threshold, determine that the scenario type corresponding to the target frame is the second pre-determined scenario; or if the encoding complexity index is less than a second complexity threshold, determine that the scenario type corresponding to the target frame is the first pre-determined scenario, where the first complexity threshold is greater than the second complexity threshold.

With reference to the second aspect, in a fourth possible implementation manner, the receiving module is further configured to receive a quantity i of motion targets in the target frame, a size $S_i$ of each motion target, a motion range $W_i$ of each motion target, and a picture size S of the target frame, where the quantity i of motion targets in the target frame, the size $S_i$ of each motion target, the motion range $W_i$ of each motion target, and the picture size S of the target frame are sent by a motion target detection apparatus;

the calculation module is further configured to calculate a picture scenario motion range P according to $P=\Sigma(S_i/S)*|S_i|$; and the determining module is further configured to determine, according to the encoding complexity index and the picture scenario motion ratio, the scenario type corresponding to the target frame.

With reference to the fourth possible implementation manner of the second aspect, in a fifth possible implementation manner, the determining module is specifically configured to: if the encoding complexity index is greater than a first complexity threshold and the picture scenario motion ratio is greater than a first motion intensity threshold, determine that the scenario type corresponding to the target frame is a second pre-determined scenario; or if the encoding complexity index is less than a second complexity threshold and the picture scenario motion ratio is less than a second motion intensity threshold, determine that the scenario type corresponding to the target frame is the first pre-determined scenario, where the first complexity threshold is greater than the second complexity threshold, and the first motion intensity threshold is greater than the second motion intensity threshold.

According to a third aspect, the present invention provides a low power-consuming encoding system, and the low power-consuming encoding system includes the encoding pre-analysis apparatus according to the second aspect, a primary encoder, and a secondary encoder, where the primary encoder or the secondary encoder is configured to: be used as a target encoder to send, to the encoding pre-analysis apparatus, a quantity of skip macroblocks and a quantity of macroblocks whose motion vectors MVs are a preset value, where the quantity of skip macroblocks and the quantity of macroblocks whose motion vectors MVs are the preset value are corresponding to a target frame; and encode the target frame.

With reference to the third aspect, in a first possible implementation manner, the low power-consuming encoding system further includes: a motion target detection apparatus, configured to: perform detection on the target frame, so as to obtain a quantity of motion targets in the target frame, a size of each motion target, a motion range of each motion target, and a size of the target frame; and send, to the encoding pre-analysis apparatus, the quantity of motion targets in the target frame, the size of each motion target, the motion range of each motion target, and the size of the target frame.

According to the low power-consuming encoding method and the apparatus provided in the embodiments of the present invention, a scenario type corresponding to a target frame encoded by a primary encoder is determined, and statistics about a quantity of first pre-determined scenarios in scenario types separately corresponding to multiple consecutive target frames are collected. When the quantity of first pre-determined scenarios exceeds a first switching threshold, a secondary encoder is used as a target encoder, so that the secondary encoder encodes a subsequent target frame. Because power consumed by the secondary encoder is less than power consumed by the primary encoder, the secondary encoder replaces the primary encoder to encode a target frame corresponding to the first pre-determined scenario, which more effectively reduces power consumption of encoding compared with a case in which the primary encoder encodes the target frame corresponding to the first pre-determined scenario.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
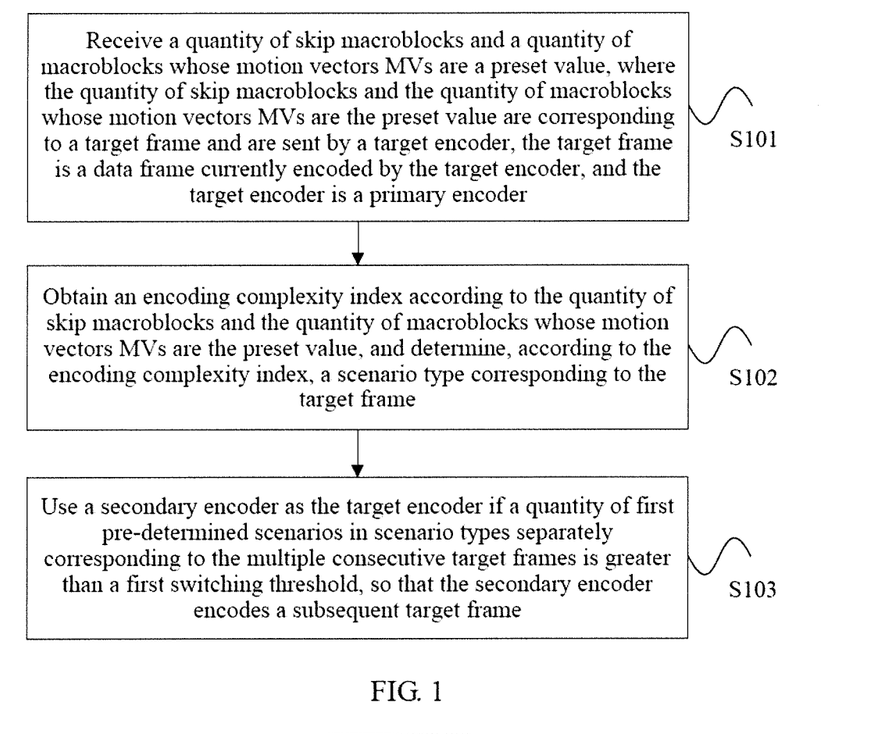
FIG. 1 is a flowchart of a low power-consuming encoding method according to an embodiment of the present invention.
Figure 2:
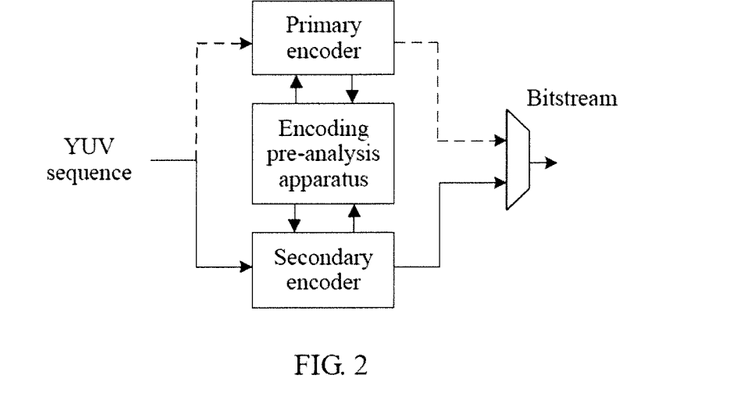
FIG. 2 is a structural diagram of an encoding system according to an embodiment of the present invention.

FIG. 1 is a flowchart of a low power-consuming encoding method according to an embodiment of the present invention. FIG. 2 is a structural diagram of an encoding system according to an embodiment of the present invention. In this embodiment of the present invention, the low power-consuming encoding method is provided by using the encoding system shown in FIG. 2. The encoding system includes an encoding pre-analysis apparatus, a primary encoder, and a secondary encoder. Both the primary encoder and the secondary encoder are configured to implement video encoding. A difference is that the primary encoder is an encoder having a strong compression capability, a small loss in picture information processing, and relatively high power consumption, and the secondary encoder is an encoder having a weak compression capability, a great loss in picture information processing, and relatively small power consumption. A function of the encoding pre-analysis apparatus is to select the primary encoder or the secondary encoder as a current encoder. Steps for performing low power-consuming encoding by using the encoding system are specifically as follows:

Step S101: Receive a quantity of skip macroblocks and a quantity of macroblocks whose motion vectors MVs are a preset value, where the quantity of skip macroblocks and the quantity of macroblocks whose motion vectors MVs are the preset value are corresponding to a target frame and are sent by a target encoder, the target frame is a data frame currently encoded by the target encoder, and the target encoder is the primary encoder.

The primary encoder is used as the target encoder to encode each frame picture of a video file, and the data frame currently encoded by the primary encoder is the target frame. After encoding the target frame, the target encoder can obtain the quantity of skip macroblocks and the quantity of macroblocks whose motion vectors MVs are the preset value, and send, to the encoding pre-analysis apparatus, the quantity of skip macroblocks and the quantity of macroblocks whose motion vectors MVs are the preset value, where the quantity of skip macroblocks and the quantity of macroblocks whose motion vectors MVs are the preset value are corresponding to the target frame and are obtained by means of calculation. In the present invention, each macroblock is corresponding to a motion vector MV, and the skip macroblock refers to a macroblock that does not carry data in all macroblocks included in the target frame.

Step S102: Obtain an encoding complexity index according to the quantity of skip macroblocks and the quantity of macroblocks whose motion vectors MVs are the preset value, and determine, according to the encoding complexity index, a scenario type corresponding to the target frame.

The encoding pre-analysis apparatus calculates the encoding complexity index according to the quantity of skip macroblocks and the quantity of macroblocks whose motion vectors MVs are the preset value, where the encoding complexity index can reflect complexity of the scenario type corresponding to the target frame; and determines, according to the complexity, whether the scenario type corresponding to the target frame is a simple motion scenario, or a complex motion scenario, or a motion scenario neither simple nor complex.

Step S103: Use the secondary encoder as the target encoder if a quantity of first pre-determined scenarios in scenario types separately corresponding to the multiple consecutive target frames is greater than a first switching threshold, so that the secondary encoder encodes a subsequent target frame.

In this embodiment of the present invention, the first pre-determined scenario is used to indicate a simple motion scenario. If the quantity of first pre-determined scenarios in scenario types separately corresponding to multiple data frames consecutively encoded by the primary encoder is greater than the first switching threshold, it indicates that there are more first pre-determined scenarios, where the first switching threshold is an empirical value set by a person skilled in the art. In this case, if a target frame corresponding to this scenario type is still encoded by the primary encoder, a large amount of power is consumed during encoding. In this case, the secondary encoder needs to be used as the target encoder, so that the secondary encoder encodes the subsequent target frame. As shown in FIG. 2, after encoding a YUV sequence that is used as picture data of the target frame, the primary encoder generates a bitstream for outputting. When performing a switchover from the primary encoder to the secondary encoder, the encoding pre-analysis apparatus specifically disables, as shown by a dashed line, the primary encoder, and enables, as shown by a solid line, the secondary encoder, so that the YUV sequence is input into the secondary encoder instead of the primary encoder.

Specifically, there are two implementation manners of collecting statistics about the quantity of first pre-determined scenarios. In one manner, before the primary encoder starts to perform encoding, an initial value of a counter S1 that is configured to collect statistics about the quantity of first pre-determined scenarios is set to 0; and when it is detected that a scenario type corresponding to a target frame is the first pre-determined scenario, a value of the counter S1 is increased by 1, where the value of the counter S1 represents the quantity of first pre-determined scenarios in the scenario types separately corresponding to the multiple consecutive target frames. In the other manner, before the primary encoder starts to perform encoding, an initial value of a counter S1 that is configured to collect statistics about the quantity of first pre-determined scenarios is set to G (G>0); and when it is detected that a scenario type corresponding to a target frame is the first pre-determined scenario, a value of the counter S1 is decreased by 1, where a difference between G and the value of the counter S1 represents the quantity of first pre-determined scenarios in the scenario types separately corresponding to the multiple consecutive target frames.

In this embodiment of the present invention, a scenario type corresponding to a target frame encoded by a primary encoder is determined, and statistics about a quantity of first pre-determined scenarios in scenario types separately corresponding to multiple consecutive target frames are collected. When the quantity of first pre-determined scenarios exceeds a first switching threshold, a secondary encoder is used as a target encoder, so that the secondary encoder encodes a subsequent target frame. Because power consumed by the secondary encoder is less than power consumed by the primary encoder, the secondary encoder replaces the primary encoder to encode a target frame corresponding to the first pre-determined scenario, which more effectively reduces power consumption of encoding compared with a case in which the primary encoder encodes the target frame corresponding to the first pre-determined scenario.

Figure 3:
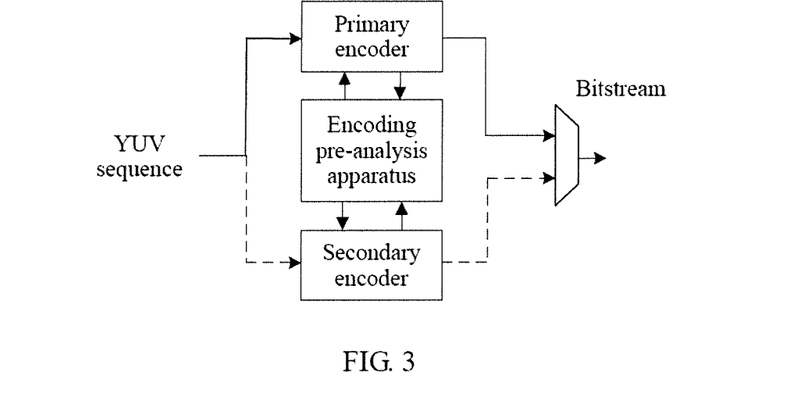
FIG. 3 is a structural diagram of an encoding system according to another embodiment of the present invention.

FIG. 3 is a structural diagram of an encoding system according to another embodiment of the present invention. On a basis of the foregoing embodiment, after the using the secondary encoder as the target encoder, so that the secondary encoder encodes a subsequent target frame, the method further includes: using the primary encoder as the target encoder if a quantity of second pre-determined scenarios in scenario types separately corresponding to the multiple subsequent consecutive target frames is greater than a second switching threshold.

After the secondary encoder is used as the target encoder, the secondary encoder starts to encode the subsequent target frame. In this embodiment of the present invention, the second pre-determined scenario is used to represent a complex motion scenario. When a quantity of complex motion scenarios in scenario types separately corresponding to multiple subsequent consecutive target frames encoded by the secondary encoder is greater than the second switching threshold, it indicates that there are more complex motion scenarios, where the second switching threshold is an empirical value set by a person skilled in the art. In this case, if a target frame corresponding to this scenario type is still encoded by the secondary encoder, encoding effect is relatively poor. In this case, the primary encoder needs to the used as the target encoder. As shown in FIG. 3, after encoding a YUV sequence that is used as picture data of the target frame, the secondary encoder generates a bitstream for outputting. When performing a switchover from the secondary encoder to the primary encoder, the encoding pre-analysis apparatus specifically disables, as shown by a dashed line, the secondary encoder, and enables, as shown by a solid line, the primary encoder, so that the YUV sequence is input into the primary encoder instead of the secondary encoder.

On a basis of this embodiment of the present invention, the obtaining an encoding complexity index according to the quantity of skip macroblocks and the quantity of macroblocks whose motion vectors MVs are the preset value includes: calculating the encoding complexity index Q according to a formula Q=(M0+M1)/N, where M0 represents the quantity of skip macroblocks, M1 represents the quantity of macroblocks whose motion vectors MVs are the preset value, and N represents a total quantity of macroblocks that is corresponding to the target frame, where the preset value is 0 or the preset value is less than ±1.

The determining, according to the encoding complexity index, a scenario type corresponding to the target frame includes:

if the encoding complexity index is greater than a first complexity threshold, determining that the scenario type corresponding to the target frame is the second pre-determined scenario; or if the encoding complexity index is less than a second complexity threshold, determining that the scenario type corresponding to the target flame is the first pre-determined scenario, where the first complexity threshold is greater than the second complexity threshold.

In this embodiment of the present invention, Th1 is used to represent the first switching threshold, Th2 is used to represent the second switching threshold, Th3 is used to represent the second complexity threshold, and Th4 is used to represent the first complexity threshold, where Th4>Th3>0. Both the second complexity threshold and the first complexity threshold are empirical values set by a person skilled in the art. In an initial state, the primary encoder is selected as the target encoder, and steps of a specific implementation method in this embodiment of the present invention are as follows:

Step S201: The encoding pre-analysis apparatus sets a value of a first counter S1 to G (G>0) and sets a value of a second counter S2 to 0, where the first counter S1 is configured to calculate a quantity of simple motion scenarios, and the second counter S2 is configured to calculate a quantity of complex motion scenarios.

Step S202: The target encoder encodes a target frame, and outputs, to the encoding pre-analysis apparatus, a quantity M0 of skip macroblocks and a quantity M1 of macroblocks whose motion vectors MVs are 0 or less than ±1 where the quantity M0 and the quantity M1 are corresponding to the target frame.

Step S203: The encoding pre-analysis apparatus calculates, according to Q=(M0+M1)/N, an encoding complexity index Q corresponding to the target frame.

Step S204: The encoding pre-analysis apparatus determines a magnitude of Q; and is Q>Th4, the encoding pre-analysis apparatus determines that a motion scenario corresponding to the target frame is the complex motion scenario, and increases the value of the second counter S2 by 1; otherwise, the encoding pre-analysis apparatus keeps the value of the second counter S2 unchanged;

if Q<Th3, the encoding pre-analysis apparatus determines that a motion scenario corresponding to the target frame is the simple motion scenario, and decreases the value of the first counter S1 to 1; otherwise, keeps the value of the first counter S1 unchanged; or if Th3≤Q≤Th4, the encoding pre-analysis apparatus determines that a motion scenario corresponding to the target frame is a motion scenario neither simple nor complex, and in this case, go back to step S202, so that the target encoder continues to encode a next target frame.

Step S205: If (G−S1)>Th1 and the target encoder is the primary encoder, set the secondary encoder as the target encoder, and go back to step S201:

if (G−S1)>Th1 and the target encoder is the secondary encoder, skip switching the current target encoder, and go back to step S201:

if S2>Th2 and the target encoder is the primary encoder, skip switching the current target encoder, and go back to step S201;

if S2>Th2 and the target encoder is the secondary encoder, set the primary encoder as the target encoder, and go back to step S201; or if (G−S1)≤Th1 and S2≤Th2, go back to step S202, and skip switching the current target encoder, so that the target encoder continues to encode a next target frame.

In this embodiment of the present invention, a motion scenario corresponding to a target frame is determined according to an encoding complexity index, thereby providing a method for effectively identifying a complex motion scenario and a simple motion scenario.

Figure 4:
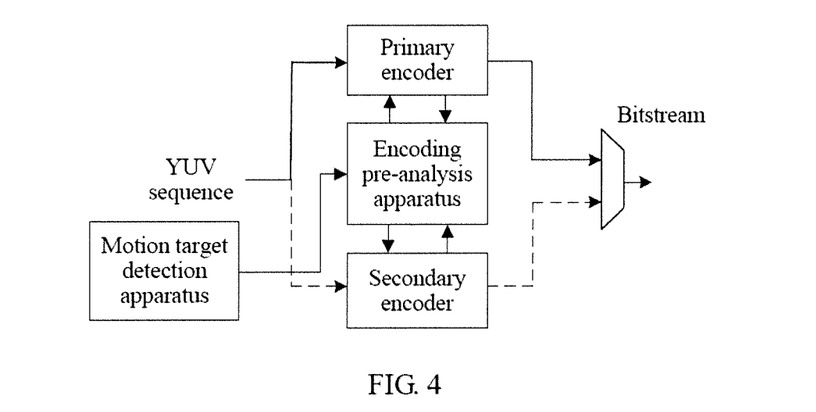
FIG. 4 is a structural diagram of an encoding system according to another embodiment of the present invention.

FIG. 4 is a structural diagram of an encoding system according to another embodiment of the present invention. On a basis of the foregoing embodiment, step S101 further includes: receiving a quantity i of motion targets in the target frame, a size $S_i$ of each motion target, a motion range $W_i$ of each motion target, and a picture size S of the target frame, and calculating a picture scenario motion ratio P according to $P=\Sigma(S_i/S)*|W_i|$, where the quantity i of motion targets in the target frame, the size $S_i$ of each motion target, the motion range $W_i$ of each motion target, and the picture size S of the target frame are sent by a motion target detection apparatus.

As shown in FIG. 4, the motion target detection apparatus performs detection on the target frame, and sends, to the encoding pre-analysis apparatus, the obtained quantity i of motion targets in the target frame, the obtained size $S_i$ of each motion target, the obtained motion range $W_i$ of each motion target, and the obtained picture size S of the target frame. The encoding pre-analysis apparatus specifically obtains the picture scenario motion ratio P by means of calculation according to $P=\Sigma(S_i/S)*|W_i|$. The picture scenario motion ratio can reflect motion intensity of the motion target in the target frame. A larger picture scenario motion ratio P indicates greater motion intensity of the motion target, which indicates that the scenario type corresponding to the target frame is the complex motion scenario, that is, the picture scenario motion ratio P may also be used as a basis for determining the scenario type corresponding to the target frame.

The determining, according to the encoding complexity index, a scenario type corresponding to the target frame in step S102 includes: determining, according to the encoding complexity index and the picture scenario motion ratio, the scenario type corresponding to the target frame.

In this embodiment of the present invention, the scenario type corresponding to the target frame is determined according to both the coding complexity index Q and the picture scenario motion ratio P that are corresponding to the target frame.

The determining, according to the encoding complexity index and the picture scenario motion ratio, the scenario type corresponding to the target frame includes: if the encoding complexity index is greater than a first complexity threshold and the picture scenario motion ratio is greater than a first motion intensity threshold, determining that the scenario type corresponding to the target frame is a second pre-determined scenario: or if the encoding complexity index is less than a second complexity threshold and the picture scenario motion ratio is less than a second motion intensity threshold, determining that the scenario type corresponding to the target frame is the first pre-determined scenario, where the first complexity threshold is greater than the second complexity threshold, and the first motion intensity threshold is greater than the second motion intensity threshold.

In this embodiment of the present invention, Th1 is used to represent the second complexity threshold, Th4 is used to represent the first complexity threshold, Th5 is used to represent the second motion intensity threshold, and Th6 is used to represent the first motion intensity threshold, where Th4>Th3>0, and Th6>Th5>0. The second motion intensity threshold and the first motion intensity threshold are empirical values set by a person skilled in the art. On a basis of the foregoing embodiment, steps S202, S203, and S204 are respectively corresponding to the following steps S302, S303, and S304:

Step S302: The target encoder encodes a target frame, and outputs, to the encoding pre-analysis apparatus, a quantity M0 of skip macroblocks and a quantity M1 of macroblocks whose motion vectors MVs are 0 or less than ±1, where the quantity M0 and the quantity M1 are corresponding to the target frame; and the motion target detection apparatus performs detection on the target frame, and sends, to the encoding pre-analysis apparatus, an obtained quantity i of motion targets in the target frame, an obtained size $S_i$ of each motion target, an obtained motion range $W_i$ of each motion target, and an obtained picture size S of the target frame.

Step S303: The encoding pre-analysis apparatus calculates, according to Q=(M0+M1)/N, an encoding complexity index Q corresponding to the target frame, and the encoding pre-analysis apparatus specifically obtains a picture scenario motion ratio P by means of calculation according to $P=\Sigma(S_i/S)*|W_i|$.

Step S304: The encoding pre-analysis apparatus separately determines a magnitude of the encoding complexity index Q and a magnitude of the picture scenario motion ratio P; and if Q>Th4 and P>Th6, determines that a motion scenario corresponding to the target frame is the complex motion scenario, and increases the value of the second counter S2 by 1; otherwise, keeps the value of the second counter S2 unchanged;

if Q<Th3 and P<Th5, determines that a motion scenario corresponding to the target frame is the simple motion scenario, and decreases the value of the first counter S1 by 1; otherwise, keeps the value of the first counter S1 unchanged; or if Th3≤Q≤Th4 or Th5≤P≤Th6, determines that a motion scenario corresponding to the target frame is a motion scenario neither simple nor complex, and in this case, go back to step S302, so that the target encoder continues to encode a next target frame.

In this embodiment of the present invention, a motion scenario corresponding to a target frame is determined by using both an encoding complexity index and a picture scenario motion ratio that are corresponding to the target frame, thereby improving precision in detecting a complex motion scenario and a simple motion scenario.

In this embodiment of the present invention, it is proposed that two encoders having different compression capabilities and different power consumption levels are disposed in one encoding system, and encoding is performed by properly using an appropriate encoder according to scenario switching. The primary encoder has an algorithm that is not simplified, a strong compression capability, and relatively high power consumption. The secondary encoder has a simple algorithm, a weak compression capability, and relatively low power consumption. For example, for the primary encoder, a compression rate is 1/N, a cost is 5 mm², and power consumption of working is 960 mW (when a 2160P30 video sequence is encoded by using a 40 mm technology); for the secondary encoder, the compression rate is 1/M (M<N), a cost is 2.5-3 mm², and power consumption of working is 400-500 mW (when the 2160P30 video sequence is encoded by using the 40 nm technology). In the simple motion scenario, the secondary encoder is selected to be used to perform encoding, and once a scenario is switched to the complex motion scenario, a switchover to the primary encoder is rapidly performed. For example, in a general application situation, the complex motion scenarios approximately account for 20% of all scenarios. In this case, power consumption of encoding is approximately 500*0.8+960*0.2=592 mW in this scenario type. Compared with a solution in which encoding is performed by using the primary encoder in all the scenarios, power consumption can be reduced by 38.3%, and benefits are extremely significant. Even if the complex motion scenarios account for 50% of all scenarios, power consumption of encoding is only 500*0.5+960*0.5=730 mW in this scenario type. Compared with a case in which encoding is performed by using the primary encoder in all the scenarios, power consumption can be reduced by 24%.

In this embodiment of the present invention, a scenario type corresponding to a target frame is determined according to encoding information corresponding to the target frame, and statistics about a quantity of first pre-determined scenarios (simple motion scenarios) in scenario types separately corresponding to multiple target frames consecutively encoded by a target encoder are collected. When the quantity is greater than a threshold, a secondary encoder is used as the target encoder to encode a next target frame. Because power consumed by the secondary encoder is less than power consumed by a primary encoder, a switchover from the primary encoder to the secondary encoder is performed, so that the secondary encoder encodes a target frame corresponding to the simple motion scenario, which more effectively reduces power consumption of encoding compared with a manner of using the primary encoder to encode both the target frame corresponding to the simple motion scenario and a target frame corresponding to a complex motion scenario.

Figure 5:
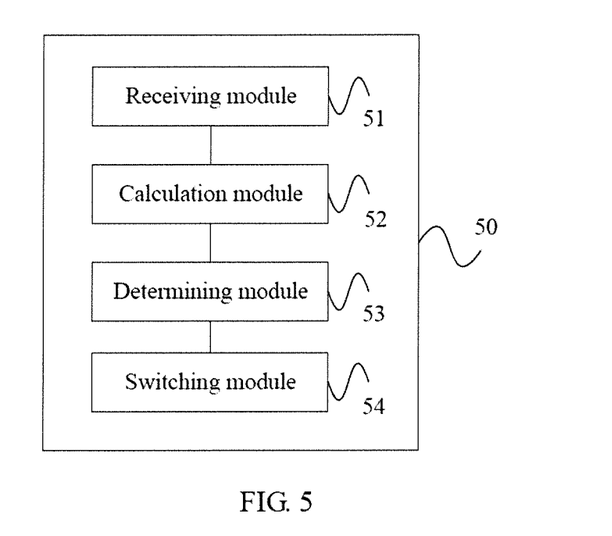
FIG. 5 is a structural diagram of an encoding pre-analysis apparatus according to an embodiment of the present invention.

FIG. 5 is a structural diagram of an encoding pre-analysis apparatus according to an embodiment of the present invention. The encoding pre-analysis apparatus provided in this embodiment of the present invention can execute a processing procedure provided in the low power-consuming encoding method embodiment. As shown in FIG. 5, an encoding pre-analysis apparatus 50 includes a receiving module 51, a calculation module 52, a determining module 53, and a switching module 54. The receiving module 51 is configured to receive a quantity of skip macroblocks and a quantity of macroblocks whose motion vectors MVs are a preset value, where the quantity of skip macroblocks and the quantity of macroblocks whose motion vectors MVs are the preset value are corresponding to a target frame and are sent by a target encoder, the target frame is a data frame currently encoded by the target encoder, and the target encoder is a primary encoder. The calculation module 52 is configured to obtain an encoding complexity index according to the quantity of skip macroblocks and the quantity of macroblocks whose motion vectors MVs are the preset value. The determining module 53 is configured to determine, according to the encoding complexity index, a scenario type corresponding to the target frame. The switching module 54 is configured to use a secondary encoder as the target encoder if a quantity of first pre-determined scenarios in scenario types separately corresponding to the multiple consecutive target frames is greater than a first switching threshold, so that the secondary encoder encodes a subsequent target frame.

In this embodiment of the present invention, a scenario type corresponding to a target frame encoded by a primary encoder is determined, and statistics about a quantity of first pre-determined scenarios in scenario types separately corresponding to multiple consecutive target frames are collected. When the quantity of first pre-determined scenarios exceeds a first switching threshold, a secondary encoder is used as a target encoder, so that the secondary encoder encodes a subsequent target frame. Because power consumed by the secondary encoder is less than power consumed by the primary encoder, the secondary encoder replaces the primary encoder to encode a target frame corresponding to the first pre-determined scenario, which more effectively reduces power consumption of encoding compared with a case in which the primary encoder encodes the target frame corresponding to the first pre-determined scenario.

On a basis of FIG. 5, the switching module 54 is further configured to use the primary encoder as the target encoder if a quantity of second pre-determined scenarios in scenario types separately corresponding to the multiple subsequent consecutive target frames is eater than a second switching threshold.

The calculation module 52 is specifically configured to calculate the encoding complexity index Q according to a formula Q=(M0+M1)/N, where M0 represents the quantity of skip macroblocks, M1 represents the quantity of macroblocks whose motion vectors MVs are the preset value, and N represents a total quantity of macroblocks that is corresponding to the target frame, where the preset value is 0 or the preset value is less than ±1.

The determining module 53 is specifically configured to: if the encoding complexity index is greater than a first complexity threshold, determine that the scenario type corresponding to the target frame is the second pre-determined scenario; or if the encoding complexity index is less than a second complexity threshold, determine that the scenario type corresponding to the target frame is the first pre-determined scenario, where the first complexity threshold is greater than the second complexity threshold.

The encoding pre-analysis apparatus provided in this embodiment of the present invention can be specifically configured to execute the method embodiment provided in the foregoing FIG. 1. For specific functions, details are not described herein again.

In this embodiment of the present invention, a motion scenario corresponding to a target frame is determined according to an encoding complexity index, thereby providing a method for effectively identifying a complex motion scenario and a simple motion scenario.

On a basis of FIG. 5, the receiving module 51 is further configured to receive a quantity i of motion targets in the target frame, a size $S_i$ of each motion target, a motion range $W_i$ of each motion target, and a picture size S of the target frame, where the quantity i of motion targets in the target frame, the size $S_i$ of each motion target, the motion range $W_i$ of each motion target, and the picture size S of the target frame are sent by a motion target detection apparatus. The calculation module 52 is further configured to calculate a picture scenario motion ratio P according to $P=\Sigma(S_i/S)*|W_i|$. The determining module 53 is further configured to determine, according to the encoding complexity index and the picture scenario motion ratio, the scenario type corresponding to the target frame.

The determining module 53 is specifically configured to: if the encoding complexity index is greater than a first complexity threshold and the picture scenario motion ratio is greater than a first motion intensity threshold, determine that the scenario type corresponding to the target frame is a second pre-determined scenario; or if the encoding complexity index is less than a second complexity threshold and the picture scenario motion ratio is less than a second motion intensity threshold, determine that the scenario type corresponding to the target frame is the first pre-determined scenario, where the first complexity threshold is greater than the second complexity threshold, and the first motion intensity threshold is greater than the second motion intensity threshold.

The encoding pre-analysis apparatus provided in this embodiment of the present invention can be specifically configured to execute the method embodiment provided in the foregoing FIG. 1. For specific functions, details are not described herein again.

In this embodiment of the present invention, a motion scenario corresponding to a target frame is determined by using both an encoding complexity index and a picture scenario motion ratio that are corresponding to the target frame, thereby improving precision in detecting a complex motion scenario and a simple motion scenario.

Figure 6:
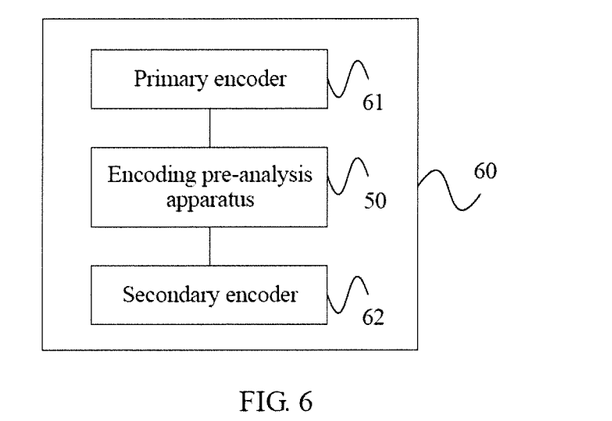
FIG. 6 is a structural diagram of a low power-consuming encoding system according to an embodiment of the present invention.

FIG. 6 is a structural diagram of a low power-consuming encoding system according to an embodiment of the present invention. The low power-consuming encoding system provided in this embodiment of the present invention can execute a processing procedure provided in the low power-consuming encoding method embodiment. As shown in FIG. 6, the low power-consuming encoding system 60 includes the encoding pre-analysis apparatus 50 in the foregoing embodiment, a primary encoder 61, and a secondary encoder 62. The primary encoder 61 or the secondary encoder 62 is configured to: be used as a target encoder to send, to the encoding pre-analysis apparatus 50, a quantity of skip macroblocks and a quantity of macroblocks whose motion vectors MVs are a preset value, where the quantity of skip macroblocks and the quantity of macroblocks whose motion vectors MVs are the preset value are corresponding to a target frame; and encode the target frame.

The low power-consuming encoding system provided in this embodiment of the present invention is consistent with the encoding system provided in FIG. 2 and that provided in FIG. 3, and can execute the processing procedure provided in the low power-consuming encoding method embodiment.

Figure 7:
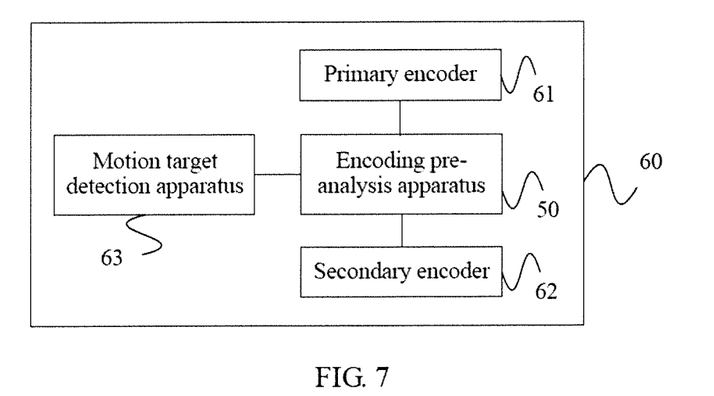
FIG. 7 is a structural diagram of a low power-consuming encoding system according to another embodiment of the present invention.

FIG. 7 is a structural diagram of a low power-consuming encoding system according to another embodiment of the present invention. The low power-consuming encoding system provided in this embodiment of the present invention can execute a processing procedure provided in the low power-consuming encoding method embodiment. As shown in FIG. 7, on a basis of FIG. 6, the low power-consuming encoding system 60 further includes a motion target detection apparatus 63. The motion target detection apparatus 63 is configured to: perform detection on the target frame, so as to obtain a quantity of motion targets in the target frame, a size of each motion target, a motion range of each motion target, and a size of the target frame; and send, to the encoding pre-analysis apparatus 50, the quantity of motion targets in the target frame, the size of each motion target, the motion range of each motion target, and the size of the target frame.

The low power-consuming encoding system provided in this embodiment of the present invention is consistent with the encoding system provided in FIG. 4, and can execute the processing procedure provided in the low power-consuming encoding method embodiment.

Figure 8:
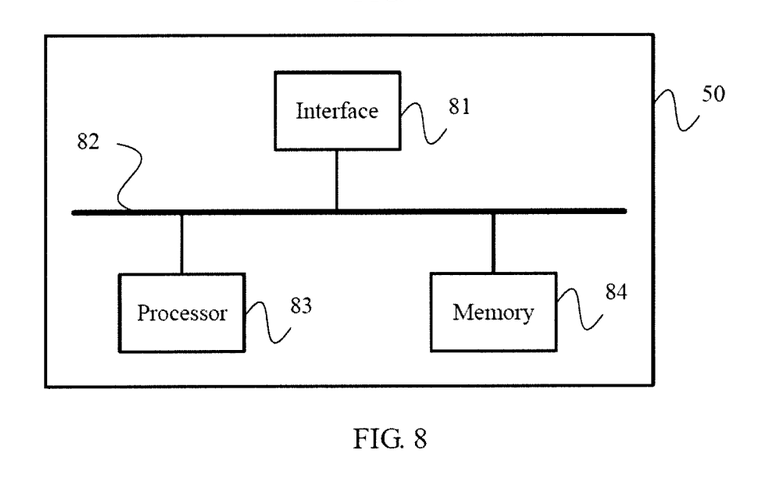
FIG. 8 is a structural diagram of an encoding pre-analysis apparatus according to another embodiment of the present invention.

FIG. 8 is a structural diagram of an encoding pre-analysis apparatus according to another embodiment of the present invention. The encoding pre-analysis apparatus provided in this embodiment of the present invention can execute a processing procedure provided in the low power-consuming encoding method embodiment. As shown in FIG. 8, the encoding pre-analysis apparatus 50 includes a bus 82, and an interface 81, a processor 83, and a memory 84 that are connected to the bus 82. The interface 81 is configured to receive a quantity of skip macroblocks and a quantity of macroblocks whose motion vectors MVs are a preset value, where the quantity of skip macroblocks and the quantity of macroblocks whose motion vectors MVs are the preset value are corresponding to a target frame and are sent by a target encoder, the target frame is a data frame currently encoded by the target encoder, and the target encoder is a primary encoder. The memory 84 is configured to store an instruction, and the quantity of skip macroblocks and the quantity of macroblocks whose motion vectors MVs are the preset value, where the quantity of skip macroblocks and the quantity of macroblocks whose motion vectors MVs are the preset value are corresponding to the target frame, sent by the target encoder, and received by the interface 81. The processor 83 is configured to execute the instruction stored in the memory 84 and configured to: obtain an encoding complexity index according to the quantity of skip macroblocks and the quantity of macroblocks whose motion vectors MVs are the preset value; determine, according to the encoding complexity index, a scenario type corresponding to the target frame; and use a secondary encoder as the target encoder if a quantity of first pre-determined scenarios in scenario types separately corresponding to the multiple consecutive target frames is greater than a first switching threshold, so that the secondary encoder encodes a subsequent target frame.

In this embodiment of the present invention, optionally, the processor 83 is further configured to: use the primary encoder as the target encoder if a quantity of second pre-determined scenarios in scenario types separately corresponding to the multiple subsequent consecutive target frames is greater than a second switching threshold.

In this embodiment of the present invention, optionally, the processor 83 is further configured to: calculate the encoding complexity index Q according to a formula $Q=(M0+M1)/N$, where M0 represents the quantity of skip macroblocks, M1 represents the quantity of macroblocks whose motion vectors MVs are the preset value, and N represents a total quantity of macroblocks that is corresponding to the target frame, where the preset value is 0 or the preset value is less than ±1.

In this embodiment of the present invention, optionally, the processor 83 is further configured to: if the encoding complexity index is greater than a first complexity threshold, determine that the scenario type corresponding to the target frame is the second pre-determined scenario; or if the encoding complexity index is less than a second complexity threshold, determine that the scenario type corresponding to the target frame is the first pre-determined scenario, where the first complexity threshold is greater than the second complexity threshold.

In this embodiment of the present invention, optionally, the interface 81 is further configured to receive a quantity i of motion targets in the target frame, a size $S_i$ of each motion target, a motion range $W_i$ of each motion target, and a picture size S of the target frame, where the quantity i of motion targets in the target frame, the size $S_i$ of each motion target, the motion range $W_i$ of each motion target, and the picture size S of the target frame are sent by a motion target detection apparatus. The memory 84 is further configured to store the quantity i of motion targets in the target frame, the size $S_i$ of each motion target, the motion range $W_i$ of each motion target, and the picture size S of the target frame, where the quantity i of motion targets in the target frame, the size $S_i$ of each motion target, the motion range $W_i$ of each motion target, and the picture size S of the target frame are sent by the motion target detection apparatus and received by the interface 81. The processor 83 is further configured to: calculate a picture scenario motion ratio P according to $P=\Sigma(S_i/S)*|W_i|$; and determine, according to the encoding complexity index and the picture scenario motion ratio, the scenario type corresponding to the target frame.

In this embodiment of the present invention, optionally, the processor 83 is further configured to: if the encoding complexity index is greater than a first complexity threshold and the picture scenario motion ratio is greater than a first motion intensity threshold, determine that the scenario type corresponding to the target frame is a second pre-determined scenario; or if the encoding complexity index is less than a second complexity threshold and the picture scenario motion ratio is less than a second motion intensity threshold, determine that the scenario type corresponding to the target frame is the first pre-determined scenario, where the first complexity threshold is greater than the second complexity threshold, and the first motion intensity threshold is greater than the second motion intensity threshold.

In this embodiment of the present invention, a scenario type corresponding to a target frame encoded by a primary encoder is determined, and statistics about a quantity of first pre-determined scenarios in scenario types separately corresponding to multiple consecutive target frames are collected. When the quantity of first pre-determined scenarios exceeds a first switching threshold, a secondary encoder is used as a target encoder, so that the secondary encoder encodes a subsequent target frame. Because power consumed by the secondary encoder is less than power consumed by the primary encoder, the secondary encoder replaces the primary encoder to encode a target frame corresponding to the first pre-determined scenario, which more effectively reduces power consumption of encoding compared with a case in which the primary encoder encodes the target frame corresponding to the first pre-determined scenario.

The low power-consuming encoding system provided in this embodiment of the present invention can execute the processing procedure provided in the low power-consuming encoding method embodiment. Specifically, the low power-consuming encoding system provided in this embodiment of the present invention can be obtained by replacing the encoding pre-analysis apparatus 50 in FIG. 6 or FIG. 7 with the encoding pre-analysis apparatus 50 shown in FIG. 8.

The low power-consuming encoding system provided in this embodiment of the present invention can execute the processing procedure provided in the low power-consuming encoding method embodiment.

In conclusion, in this embodiment of the present invention, a scenario type corresponding to a target frame encoded by a primary encoder is determined, and statistics about a quantity of first pre-determined scenarios in scenario types separately corresponding to multiple consecutive target frames are collected. When the quantity of first pre-determined scenarios exceeds a first switching threshold, a secondary encoder is used as a target encoder, so that the secondary encoder encodes a subsequent target frame. Because power consumed by the secondary encoder is less than power consumed by the primary encoder, the secondary encoder replaces the primary encoder to encode a target frame corresponding to the first pre-determined scenario, which more effectively reduces power consumption of encoding compared with a case in which the primary encoder encodes the target frame corresponding to the first pre-determined scenario. A motion scenario corresponding to the target frame is determined by using an encoding complexity index, thereby providing a method for effectively identifying a complex motion scenario and a simple motion scenario. A motion scenario corresponding to the target frame is determined by using both an encoding complexity index and a picture scenario motion ratio that are corresponding to the target frame, thereby improving precision in detecting a complex motion scenario and a simple motion scenario.

In the embodiments provided in the present invention, it should be understood that the disclosed apparatus and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons stalled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A low power-consuming encoding method, comprising:
receiving, from a primary encoder, a quantity of skip macroblocks and a quantity of macroblocks whose motion vectors (MVs) are a preset value, wherein the quantity of skip macroblocks and the quantity of macroblocks whose MVs are the preset value correspond to a target frame, the target frame being a data frame encoded by the primary encoder;
obtaining an encoding complexity index corresponding to the target frame, according to the quantity of skip macroblocks and the quantity of macroblocks whose MVs are the preset value;
determining, according to the encoding complexity index, a scenario type corresponding to the target frame;
determining, according to the scenario type corresponding to the target frame, a quantity of first pre-determined scenarios corresponding to multiple consecutive target frames encoded by the primary encoder;
determining that the quantity of first pre-determined scenarios is greater than a first switching threshold; and
in response to determining that the quantity of first pre-determined scenarios is greater than a first switching threshold, using a secondary encoder to encode a subsequent target frame.

2. The method according to claim 1, further comprising:
using the primary encoder to encode a second subsequent target frame in response to determining that a quantity of second pre-determined scenarios in scenario types corresponding to second multiple subsequent consecutive target frames encoded by the secondary encoder is greater than a second switching threshold.

3. The method according to claim 2, wherein the obtaining the encoding complexity index corresponding to the target frame, according to the quantity of skip macroblocks and the quantity of macroblocks whose MVs are the preset value comprises:
calculating the encoding complexity index Q according to a formula $Q=(M0+M1)/N$ wherein M0 represents the quantity of skip macroblocks, M1 represents the quantity of macroblocks whose MVs are the preset value, and N represents a total quantity of macroblocks which correspond to the target frame,
wherein the preset value is 0 or the preset value is less than ±1.

4. The method according to claim 2, wherein the determining, according to the encoding complexity index, the scenario type corresponding to the target frame comprises:
when the encoding complexity index is greater than a first complexity threshold, determining that the scenario type corresponding to the target frame is the second pre-determined scenario; or
when the encoding complexity index is less than a second complexity threshold, determining that the scenario type corresponding to the target frame is the first pre-determined scenario,
wherein
the first complexity threshold is greater than the second complexity threshold.

5. The method according to claim 1, wherein the method further comprises:
receiving a quantity i of motion targets in the target frame, a size $S_i$ of each motion target, a motion range $W_i$ of each motion target, and a picture size S of the target frame, and calculating a picture scenario motion ratio P according to $P=\Sigma(S_i/S)*|W_i|$, wherein the quantity i of motion targets in the target frame, the size $S_i$ of each motion target, the motion range $W_i$ of each motion target, and the picture size S of the target frame are sent by a motion target detection apparatus; and
the determining, according to the encoding complexity index, the scenario type corresponding to the target frame comprises:
determining, according to the encoding complexity index and the picture scenario motion ratio, the scenario type corresponding to the target frame.

6. The method according to claim 5, wherein the determining, according to the encoding complexity index and the picture scenario motion ratio, the scenario type corresponding to the target frame comprises:
when the encoding complexity index is greater than a first complexity threshold and the picture scenario motion ratio is greater than a first motion intensity threshold, determining that the scenario type corresponding to the target frame is a second pre-determined scenario; or
when the encoding complexity index is less than a second complexity threshold and the picture scenario motion ratio is less than a second motion intensity threshold, determining that the scenario type corresponding to the target frame is the first pre-determined scenario,
wherein
the first complexity threshold is greater than the second complexity threshold, and the first motion intensity threshold is greater than the second motion intensity threshold.

7. An encoding pre-analysis apparatus, comprising:
a non-transitory computer readable medium configured to store instructions; and
a processor configured to execute the instructions stored in the non-transitory computer readable medium to:
receive, from a primary encoder, a quantity of skip macroblocks and a quantity of macroblocks whose motion vectors (MVs) are a preset value, wherein the quantity of skip macroblocks and the quantity of macroblocks whose MVs are the preset value correspond to a target frame, the target frame being a data frame encoded by the primary encoder, obtain an encoding complexity index corresponding to the target frame, according to the quantity of skip macroblocks and the quantity of macroblocks whose MVs are the preset value, determine, according to the encoding complexity index, a scenario type corresponding to the target frame, determine, according to the scenario type corresponding to the target frame, a quantity of first pre-determined scenarios corresponding to multiple consecutive target frames encoded by the primary encoder, determine that the quantity of first pre-determined scenarios is greater than a first switching threshold, and in response to determining that the quantity of first pre-determined scenarios is greater than a first switching threshold, use a secondary encoder to encode a subsequent target frame.

8. The encoding pre-analysis apparatus according to claim 7, wherein the processor is further configured to use the primary encoder to encode a second subsequent target frame in response to determining that a quantity of second pre-determined scenarios in scenario types corresponding to second multiple subsequent consecutive target frames encoded by the secondary encoder is greater than a second switching threshold.

9. The encoding pre-analysis apparatus according to claim 8, wherein the processor is configured to calculate the encoding complexity index Q according to a formula Q=(M0+M1)/N wherein M0 represents the quantity of skip macroblocks, M1 represents the quantity of macroblocks whose MVs are the preset value, and N represents a total quantity of macroblocks which correspond to the target frame, wherein the preset value is 0 or the preset value is less than ±1.

10. The encoding pre-analysis apparatus according to claim 8, wherein the processor is configured to:

when the encoding complexity index is greater than a first complexity threshold, determine that the scenario type corresponding to the target frame is the second pre-determined scenario; or when the encoding complexity index is less than a second complexity threshold, determine that the scenario type corresponding to the target frame is the first pre-determined scenario, wherein the first complexity threshold is greater than the second complexity threshold.

11. The encoding pre-analysis apparatus according to claim 7, wherein the processor is further configured to:

receive a quantity i of motion targets in the target frame, a size $S_i$ of each motion target, a motion range $W_i$ of each motion target, and a picture size S of the target frame, wherein the quantity i of motion targets in the target frame, the size $S_i$ of each motion target, the motion range $W_i$ of each motion target, and the picture size S of the target frame are sent by a motion target detection apparatus, calculate a picture scenario motion ratio P according to P=Σ(S_i/S)*|W_i|, and determine, according to the encoding complexity index and the picture scenario motion ratio, the scenario type corresponding to the target frame.

12. The encoding pre-analysis apparatus according to claim 11, wherein the processor is configured to:

when the encoding complexity index is greater than a first complexity threshold and the picture scenario motion ratio is greater than a first motion intensity threshold, determine that the scenario type corresponding to the target frame is a second pre-determined scenario; or when the encoding complexity index is less than a second complexity threshold and the picture scenario motion ratio is less than a second motion intensity threshold, determine that the scenario type corresponding to the target frame is the first pre-determined scenario, wherein the first complexity threshold is greater than the second complexity threshold, and the first motion intensity threshold is greater than the second motion intensity threshold.

13. A low power-consuming encoding system, comprising:

a primary encoder;

a secondary encoder; and an encoding pre-analysis apparatus, comprising:

a non-transitory computer readable medium configured to store instructions; and a processor configured to execute the instructions stored in the non-transitory computer readable medium to:

receive, from a primary encoder, a quantity of skip macroblocks and a quantity of macroblocks whose motion vectors (MVs) are a preset value, wherein the quantity of skip macroblocks and the quantity of macroblocks whose MVs are the preset value correspond to a target frame, the target frame being a data frame encoded by the primary encoder, obtain an encoding complexity index corresponding to the target frame, according to the quantity of skip macroblocks and the quantity of macroblocks whose MVs are the preset value, determine, according to the encoding complexity index, a scenario type corresponding to the target frame, determine, according to the scenario type corresponding to the target frame, a quantity of first pre-determined scenarios corresponding to multiple consecutive target frames encoded by the primary encoder, determine that the quantity of first pre-determined scenarios is greater than a first switching threshold, and in response to determining that the quantity of first pre-determined scenarios is greater than a first switching threshold, use the secondary encoder to encode a subsequent target frame, wherein the primary encoder or the secondary encoder is configured to:

send, to the encoding pre-analysis apparatus, the quantity of skip macroblocks and the quantity of macroblocks whose MVs are the preset value, and encode the target frame.

14. The low power-consuming encoding system according to claim 13, wherein the processor is further configured to use the primary encoder to encode a second subsequent target frame in response to determining that a quantity of second pre-determined scenarios in scenario types corresponding to second multiple subsequent consecutive target frames encoded by the secondary encoder is greater than a second switching threshold.

15. The low power-consuming encoding system according to claim 14, wherein the processor is configured to calculate the encoding complexity index Q according to a formula Q=(M0+M1)/N, where M0 represents the quantity of skip macroblocks, M1 represents the quantity of macroblocks whose MVs are the preset value, and N represents a total quantity of macroblocks which correspond to the target frame, wherein the preset value is 0 or the preset value is less than ±1.

16. The low power-consuming encoding system according to claim 14, wherein the processor is configured to:
when the encoding complexity index is greater than a first complexity threshold, determine that the scenario type corresponding to the target frame is the second predetermined scenario; or
when the encoding complexity index is less than a second complexity threshold, determine that the scenario type corresponding to the target frame is the first predetermined scenario,
wherein
the first complexity threshold is greater than the second complexity threshold.

17. The low power-consuming encoding system according to claim 13, wherein the low power-consuming encoding system further comprises:
a motion target detection apparatus, configured to:
perform detection on the target frame, so as to obtain a quantity of motion targets in the target frame, a size of each motion target, a motion range of each motion target, and a size of the target frame; and
send, to the encoding pre-analysis apparatus, the quantity of motion targets in the target frame, the size of each motion target, the motion range of each motion target, and the size of the target frame.

18. The low power-consuming encoding system according to claim 13, wherein the processor is further configured to disable the primary encoder when the secondary encoder is used so that the subsequent target frame is input to the secondary encoder instead of the primary encoder.

19. The low power-consuming encoding system according to claim 13, wherein the processor is configured to calculate the encoding complexity index based on a proportion of the quantity of skip macroblocks and the quantity of macroblocks whose MVs are the preset value to a total quantity of macroblocks which correspond to the target frame.

20. The low power-consuming encoding system according to claim 13, wherein the processor is configured to:
calculate a picture scenario motion ratio based on at least one of a quantity of motion targets in the target frame, a size of each motion target, a motion range of each motion target, or a picture size of the target frame, and
determine, according to the encoding complexity index and the picture scenario motion ratio, the scenario type corresponding to the target frame.

* * * * *

UNITED STATES PATENT AND TRADEMARK OFFICE
CERTIFICATE OF CORRECTION

PATENT NO. : 10,687,066 B2
APPLICATION NO. : 15/471419
DATED : June 16, 2020
INVENTOR(S) : Ming Li Page 1 of 1

It is certified that error appears in the above-identified patent and that said Letters Patent is hereby corrected as shown below:

In the Claims

In Column 17, Line 63, in Claim 3, delete "$Q=(M0+M1)/N$" and insert -- $Q=(M0+M1)/N$, --, therefor.

In Column 19, Line 28, in Claim 9, delete "$Q=(M0+M1)/N$" and insert -- $Q=(M0+M1)/N$, --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*